United States Patent [19]

Shedigian

[11] Patent Number: 4,536,331
[45] Date of Patent: Aug. 20, 1985

[54] NON-TOXIC IMPREGNANT FOR ELECTRICAL CAPACITORS

[75] Inventor: Vandos Shedigian, Indianapolis, Ind.

[73] Assignee: Emhart Industries, Inc., Indianapolis, Ind.

[21] Appl. No.: 545,989

[22] Filed: Oct. 27, 1983

Related U.S. Application Data

[63] Continuation of Ser. No. 385,669, Jun. 7, 1982, abandoned.

[51] Int. Cl.³ .......................... H01B 3/22; H01B 3/20
[52] U.S. Cl. ................................. 252/579; 252/570; 361/319
[58] Field of Search .................. 252/578, 579, 570; 361/319; 174/17 LF, 23 C, 25 C; 336/94

[56] References Cited

U.S. PATENT DOCUMENTS 3,450,968  6/1969  Cox ............................... 317/258
4,290,926  9/1981  Shaw ............................. 252/578 X
4,388,669  6/1983  Cichanowski .................. 252/578 X

OTHER PUBLICATIONS

Clark, Insulating Materials for Design and Engineering Practice, Wiley (1970), pp. 383–385, 342–344.
Bednarcyk, Edible Oils & Fats, Noyes (1969), pp. 287–289.

Primary Examiner—John Goodrow
Attorney, Agent, or Firm—Robert F. Meyer

[57] ABSTRACT

Soybean oil is used as a non-toxic dielectric fluid for a-c electrical capacitors. An additive of butylated hydroxyanisole is provided to prevent the soybean oil from becoming rancid. Another additive of α-dodocene-tetradecene is provided as a gas absorber for the soybean oil.

3 Claims, 3 Drawing Figures

NON-TOXIC IMPREGNANT FOR ELECTRICAL CAPACITORS

This application is a continuation of application Ser. No. 385,669, filed June 7, 1982, now abandoned.

BACKGROUND OF THE INVENTION

This invention relates to a dielectric liquid impregnant for electrical devices and more particularly to an electrical capacitor utilizing an improved non-toxic dielectric liquid impregnant theretofore.

Liquid impregnants for electrical capacitors should have a high dielectric constant, maintain a low dissipation factor, and be compatible with the other materials utilized in capacitor structure. At the same time, the impregnant must withstand elevated and fluctuating temperature, pressure, and voltage stress conditions with excellent electrical characteristics for a long operative life of the capacitor.

The polychlorinated biphenyls as capacitor impregnants meet these requirements and they were eminently satisfactory for several decades. The polychlorinated biphenyls are broadly referred to as PCBs. The polychlorinated bihpenyls have recently been associated with ecological problems, restrictive use limitations, and rising costs. These problems have spurred the search for a suitable non-toxic replacement capacitor impregnant which would have some advantageous impregnant characteristics comparable to those of the chlorinated diphenyls, and still provide outstanding electrical and compatibility performance with the two most important present day capacitor solid dielectrics, paper and polypropylene.

In the search of a non-toxic liquid impregnant, consideration must also be given to gas absorbing properties and offensive odor which may evolve when the capacitor is used for prolonged periods at elevated temperatures. Good gas absorbant properties prolong capacitor life.

FEATURES OR OBJECTS OF THE INVENTION

It is therefore, a feature of the invention to provide a dielectric impregnating fluid that is non-toxic. Another feature of the invention is to provide such an impregnating fluid that includes soybean oil. Another feature of the invention is the provision of such a dielectric impregnating fluid that includes an additive which prevents the evolution of offensive odor. Still another feature is the provision of such an additive which includes butylated hydroxyanisole. Another feature of the invention is the provision of such a dielectric impregnating fluid that includes an additive providing good gas absorbing properties for the soybean oil. Yet still another feature of the invention is the provision of such an additive that includes an olefin such as decene, dodecene and tetradecene. Yet another feature of the invention is the provision of such an additive that includes α-dodecene-tetrodecene. These and other features of the invention will become apparent from the following description taken in conjunction with the accompanying drawings.

SUMMARY OF THE INVENTION

Geneally speaking, the present invention pertains to a capacitor having a dielectric fluid which includes soybean oil and a minor amount of an additive of butylated hydroxyanisole. In addition, the dielectric fluid could include an additive of an olefin taken from the class consisting essentially of decene, dodecene, and tetradecene, the preferred additive being α-dodecene-tetradecene.

DISCUSSION OF THE INVENTION

Figure 1:
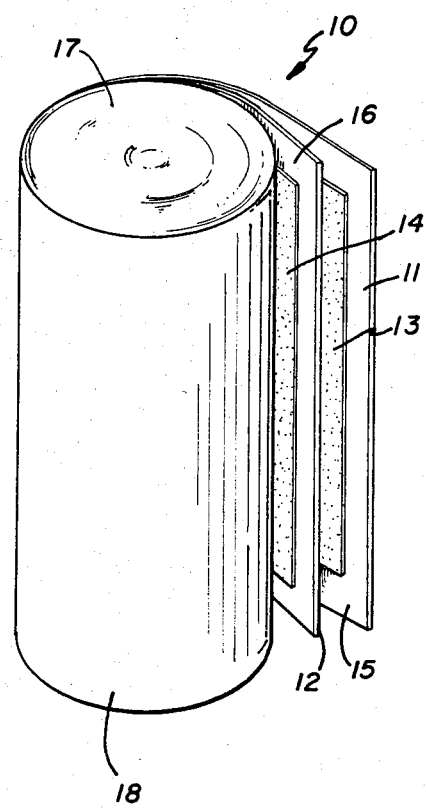
FIG. 1 of the drawing illustrates a convolutely would a-c capacitor body partially unwound to show the dielectric plastic film and foil electrode structure.
Figure 2:
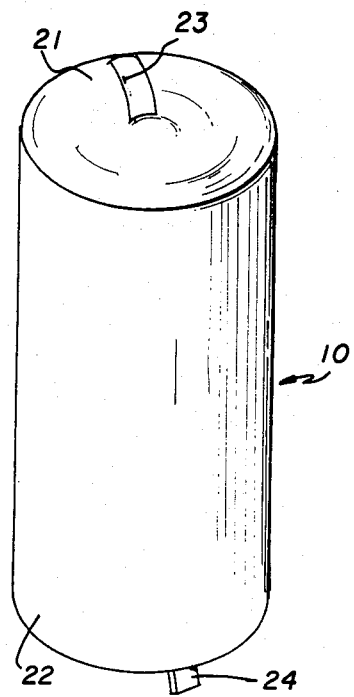
FIG. 2 of the drawing illustrates the convolutely wound a-c capacitor body of FIG. 1 to which leads are attached.

Referring now to FIG. 1 of the drawing, there is illustrated a convolutely wound a-c capacitor body 10. The capacitor body 10 includes a pair of dielectric film layers 11 and 12 and overlying electrodes 13 and 14 respectively. Electrodes 13 and 14 are of a suitable metal such as aluminum for example. Margins 15 and 16 are provided for preventing electrical short circuit between the electrodes. As shown in FIG. 2, suitable terminal leads 23 and 24 are attached to the electrodes 13 and 14 from opposite ends 21 and 22 of the capacitor body 10. Suitable lead material could be solder coated copper for example.

The dielectric plastic films or layers 11 and 12 should have high dielectric strength, low dissipation factor to prevent thermal runaway, broad temperature range capabilities, resistance to the dielectric fluid, and freedom from pinholes and conductive particles. Suitable dielectric film layers 11 and 12 may be paper, a paper and polymeric film combination, or polymeric films.

Figure 3:
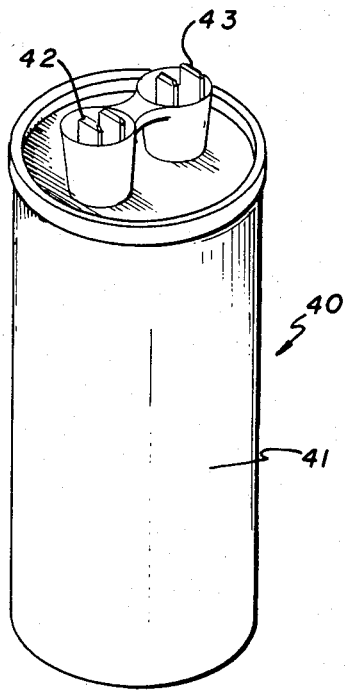
FIG. 3 of the drawing illustrates the a-c capacitor body suitably encased and sealed in a housing.

In FIGS. 2 and 3, a capacitor body 10 is preferably sealed to a can or housing 40 to form a capacitor 31. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

As noted previously, fluid or liquid dielectric impregnants for electrical capacitors should have a high dielectric constant, maintain a low dissipation factor and be compatible with the other materials used in capacitor structure. According to the present invention, the dielectric fluid which is used to impregnate capacitor body 10 not only satisfies these requirements, but is substantially non-toxic. The dielectric fluid of the present invention includes refined soybean oil. A useful soybean oil for the present invention would be of a low acid grade with a flash point of about 325° C. which is available in commercial quantities.

In order to prevent the soybean oil from becoming rancid when capacitors are used at elevated temperatures for long periods of time and giving off offensive odors, a minor amount of butylated hydroxyanisole is added to the soybean oil. The amount added should be between 0.05% to 10% by weight of the total weight of the dielectric fluid.

Another problem with dielectric fluids in capacitors is that of gas generation which likely occurs at high stress "hot spot" areas which eventually leads to capacitor failures. Therefore, an additive of a good gas absorbing medium needs to be provided to the dielectric impregnate in the capacitor. The main gases generated in capacitors of the type described and using soybean oil as the dielectric impregnant are peroxides and hydrogen. It has been found that a good gas absorber under these conditions are olefins such as decene, dodecene, tetradecene and hexadecene. A particularly useful additive to soybean oil has been found to be α-dodecene-tetradocene in an amount of from 0.1% to 50% by volume of the total amount of dielectric fluid with 10% being preferred.

One thousand hour life tests were performed on eight electrical capacitors of the type described in FIGS. 1–3 using soybean oil as a dielectric fluid impregnant. Four of the capacitors used a dielectric fluid which included an additive of 1.0% by weight of the total weight of the dielectric fluid of butylated hydroxyanisole (Group I) and four of the capacitors included an additional additive of 10% by volume of the total volume of the dielectric fluid of α-dodecene-tetradecene (Group II). The results are shown in Table I which presents average capacity and dissipation factors.

ELECTRIC CAPACITOR PROPERTIES
Capacitance and % Dissipation Factor (DF) Stability
During Life Test
25.0 up 370 VAC rated capacitor operated at 495 VAG
80° C. Life Test
Dielectric - 2 layers × 0.45 Mils + 2 layers × 0.40 mil paper

|  | GROUP I | | GROUP II | |
|---|---|---|---|---|
|  | Initial | 1000 Hrs. | Initial | 1000 Hrs. |
| Capacitance-uF | | | | |
| 25° C. | 17.6 | 17.6 | 18.0 | 18.0 |
| 65° C. | 17.2 | 17.3 | 17.6 | 17.6 |
| 85° C. | 17.1 | 17.0 | 17.5 | 17.6 |
| % Dissipation Factor | | | | |
| 25° C. | 0.165 | 0.292 | 0.164 | 0.206 |
| 65° C. | 0.122 | 0.233 | 0.131 | 0.216 |
| 85° C. | 0.119 | 0.245 | 0.130 | 0.216 |

It is seen that over a life test of 1000 hours, the capacitor exhibited good stability. There was no evidence of offensive odors or "hot spots" due to gas generation.

What is claimed is:

1. A dielectricimpregnating fluid used in a capacitor, the dielectric fluid including a refined low acid soybean oil having a flash point of about 325° C. a first additive of butylated hydroxyanisole in an amount of from about 0.05% to 10% by weight of the total weight of said dielectric fluid, and a second additive of an olefin taken from the class consisting of decene, dodecene, tetradecene, hexadecene, in an amount of from 0.1% to 50% by volume of the total amount of dielectric fluid said second additive acting as a good gas absorber of peroxides and hydrogen.

2. The dielectric fluid in a capacitor according to claim 1 wherein said second additive is α-dodecene-tetradecene.

3. The dielectric fluid in a capacitor according to claim 1 wherein said second additive is in an amount of about 10% by volume of the total volume of said dielectric fluid.

* * * * *